April 12, 1966   J. VAN DER KULK   3,245,801
PROCESS FOR PREPARING FATTY COMPOSITIONS
Filed Sept. 20, 1962   4 Sheets-Sheet 1

INVENTOR
JAN VAN DER KULK

BY
his ATTORNEYS

April 12, 1966 J. VAN DER KULK 3,245,801
PROCESS FOR PREPARING FATTY COMPOSITIONS
Filed Sept. 20, 1962 4 Sheets-Sheet 2

INVENTOR
JAN VAN DER KULK

BY
his ATTORNEYS

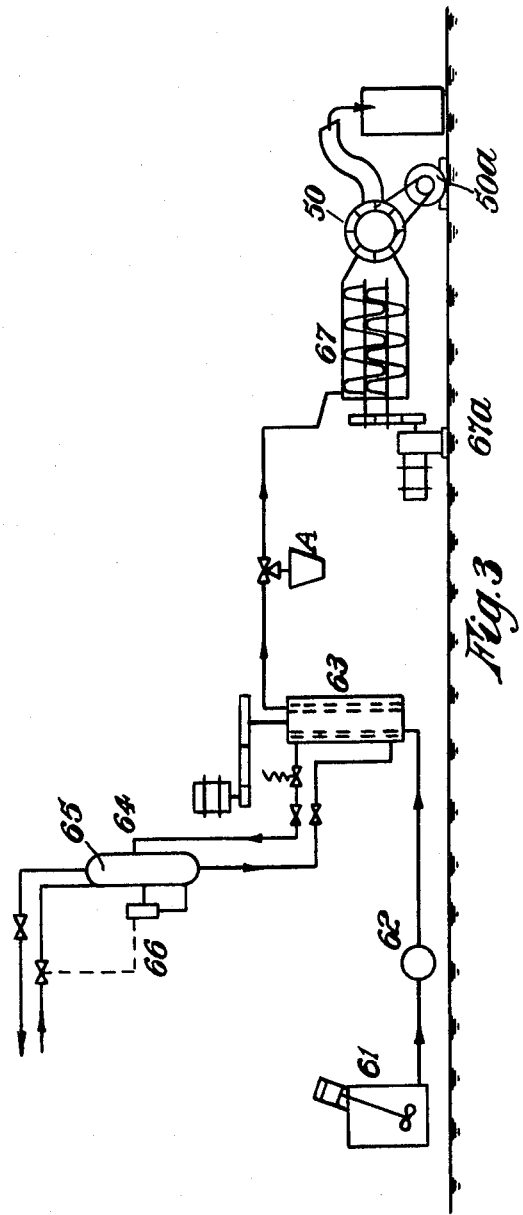

United States Patent Office 3,245,801
Patented Apr. 12, 1966

3,245,801
PROCESS FOR PREPARING FATTY COMPOSITIONS
Jan van der Kulk, Rotterdam, Netherlands, assignor to Lever Brothers Company, New York, N.Y., a corporation of Maine
Filed Sept. 20, 1962, Ser. No. 224,924
Claims priority, application Great Britain, Oct. 3, 1961, 35,624/61
6 Claims. (Cl. 99—118)

The invention relates to an improved process and apparatus for the continuous production of fatty compositions, such as shortenings and margarine.

It is known to produce margarine and shortenings continuously with the aid of a scraped-surface heat exchanger such as is commonly termed a "votator." In such a process the liquid mixture enters the A-unit of the votator under high pressures, ranging from 20 to 40 atm., and proceeds through an annular space between the wall of the processing cylinder and a coaxial, rapidly revolving shaft, to which is fitted with scraper blades, the processing cylinder being cooled. While the mixture is pumped through the processing cylinder it is cooled, vigorously stirred and mixed by the scraper blades on the shaft, which revolves at high speed, e.g. 400–700 r.p.m. The heat transfer surface is kept clean by the instantaneous removal by the scraper blades of the film of solidified fat formed on the surface. The vigorous stirring and the cooling that take place when the heat is extracted in the time available, i.e. about 6–8 seconds, through the available transfer surface, keep the product in a semi-fluid condition at the outlet of the votator, where it emerges at a temperature of about 12–14° C. Then the semi-fluid mixture is passed to a so-called B-unit, a cylinder in which further crystallisation takes place and in which the product solidifies sufficiently for handling by moulding, wrapping and packaging machinery.

Although the votator is a suitable apparatus for continuously producing margarine and shortenings, especially since it forms a closed system, and the product is consequently not exposed to the air, there are several drawbacks. Votator margarine, as compared with margarine prepared in the conventional way by means of a churn and a cooling drum, consists mainly of very small crystals, which give the product a hard consistency after crystallisation. The plasticity of the product is therefore generally lower and there may be a somewhat greater tendency towards oil-exudation. Furthermore, one is less free in the choice of the raw materials for making a quality product and therefore more affected by variation in the market prices of the raw materials. Finally, with a votator it is difficult to produce pastry margarines, owing to the high content of high-melting fats in this type of margarine.

It is an object of the invention to provide a new process and apparatus for the continuous production of fatty compositions such as shortenings and margarine, in which the above-mentioned drawbacks are avoided and a fatty composition is obtained which in quality closely resembles the product made on a churn and cooling drum. A further object of the invention is to prepare continuously and in a closed system margarines containing a high percentage of high-melting fats, such as pastry margarines.

The present invention provides a process for the production of normally solid fat compositions by a method comprising rapid cooling of the molten fat, by passage through an elongated annular space defined by two surfaces one of which is refrigerated and scraped, followed in succession by further crystallisation and working, characterised in that the temperature to which the composition is rapidly cooled is within the range −5 to about +5° C., (preferably −5 to +2° C.) and that the cooled composition passes directly to a crystallising zone through which it is positively urged slowly without substantial agitation and in which it remains until crystallisation substantially ceases, and then to a zone in which it is worked to impart the desired plasticity the residence time of the composition within the annular space being within the range 1 to 10 seconds.

In practice the crystallisation process may be determined by measuring the temperature at equal time intervals and tracing the relevant curve in a temperature-time diagram. The crystallisation may be considered as complete when the curve does not rise any more, showing that no further heat of crystallisation is being liberated.

The time in which the composition is cooled is preferably kept within the range of from 1 to 3 seconds for ordinary margarine and shortenings. For margarine containing a high percentage of high-melting fats, such as pastry margarine, it is preferably kept between 2 or 3 to 6 or 8 seconds. The most suitable temperature to which the composition is cooled is approximately 1° C., but cooling temperatures may range from −5° to +5° or +6° C.

The rapidly cooled composition is preferably urged slowly but positively (to avoid channeling) through the crystallising chamber to a farther region in which the mechanical working is effected. The avoidance of channelling is important to ensure that substantially every part of the charge has the same residence time in the chamber. This time must be sufficient for crystallisation to have substantially ceased by the time each part of the charge leaves the chamber. Passage through the chamber must be relatively slow to avoid substantial agitation. Although the charge preferably moves slowly through the chamber rather than remaining completely at rest, it is convenient to refer to its residence in the chamber as a rest treatment, to the time of residence therein as the rest period and to the apparatus (comprising one or more crystallising chambers) for effecting the rest treatment as the resting apparatus. This period should not be less than 5 minutes and may be up to 25 minutes or even longer. After the rest treatment the solidified mixture is worked mechanically by means of beating or kneading apparatus which may be of conventional construction. To obtain a good product all steps of the process are necessary, viz., (a) quick, deep cooling, (b) resting, and (c) working. Especially the resting process, which must fulfil the condition that the product is allowed to remain for a certain time while being slowly moved, without substantial working, is an important feature in the preparation of the product.

For carrying out the rapid cooling step of the invention suitable apparatus comprise a scraped-surface heat exchanger having an outer cylindrical member provided with a cooling jacket and concentric therewith an inner cylindrical member provided with scraper blades arranged to contact the inner surface of said outer member, the difference in diameter between the outer surface of the inner member and the inner surface of the outer member being 1 to 6 mm. and the ratio of the diameter of said inner surface to its axial length being within the range 1:1 to 1:4, means being provided for rotating the inner member relative to the outer member at a speed within the range 60 to 100 r.p.m. With this system it is possible to cool down the composition to very low temperatures about 0° C. or even less. Moreover, the residence time of the liquid composition is so short that crystallisation is very incomplete. The most suitable proportions of the processing cylinder are first of all determined by the requirement that the fatty composition should be cooled down in a very short time, but also the dimensions of the cylinder must be such that with a large cooling surface and a narrow annular space a satisfactory throughput can be obtained without involving too high pressures. In practice the diameter of the processing cylinder may lie in the range of 15 to 50 cm. and its length in the range of 30 to 50 cm., the number of rotations of the shaft being preferably from 60 to 100 r.p.m. Such a unit has a throughput of the order of 200 kg. per hour. It it be desired to increase this throughput, two or more units may be used. When using such a unit the product is very deeply cooled, only a small amount of heat of crystallisation has to be removed and very little mechanical work has to be done. In this way the advantages of the conventional votator process as well as those of the churn process are combined in the process of the invention. Moreover, the product obtained possesses a very fine dispersion of the aqueous phase, which promotes the protection of the product against deterioration by microorganisms.

In the crystallising chamber the product is subjected to a rest treatment of the order of about 10–25 minutes, depending on the composition. The resting apparatus as used in the process of the invention should satisfy the following requirements:

(1) The rest treatment takes place in such a way that no channelling of the mixture occurs and that each part of the charge has substantially the same resting period;

(2) The rest treatment is effected with slow movement of the cooled mixture through the resting chamber;

(3) During the resting period the cooled mixture is worked as little as possible, while being slowly moved;

(4) The charge is enclosed throughout its residence in the resting apparatus.

Two suitable forms of resting apparatus are shown in FIGURES 1 and 1a and in FIGURES 2a, 2b and 2c respectively of the accompanying drawings. The resting apparatus of FIGURE 1 comprises two separate cylindrical crystallising chambers arranged for alternate operation. The fatty composition is fed to the cylinders periodically and uniformly by means controlled by a time-relay, so that the resting period of the composition in each cylinder is always the same and independent of process conditions. By means of a distributing slide valve, the fatty composition coming from the votator is alternately and for equal periods fed to the first and to the second cylinder. If one resting cylinder is full, the other begins to fill. By means of a slide valve, the working apparatus is alternately connected with the first cylinder and with the second cylinder, and the fatty composition contained in the cylinders is thus transported to the working apparatus. This slide valve is automatically adjusted in such a way that when the composition is being transported to one of the resting cylinders, there is no connection between this cylinder and the working apparatus, whereas during the period that no margarine is transported from the votator to this resting cylinder, the slide valve provides a connection between this cylinder and the working apparatus.

Furthermore provisions have been made to ensure that during normal working conditions a continuous production is obtained, even when the capacity of the votator and the packaging machine (which, in the production of margarine and plastic shortenings, will commonly follow the working apparatus) are different. In practice it will not generally be possible to coordinate exactly the production of votator and packaging machine. It will therefore be necessary for the capacity of the votator to be slightly greater than that of the packaging machine. Means are provided to ensure that the excess margarine produced by the votator is removed as "re-work margarine" and in such a way that this re-work margarine is periodically and equally divided over the two cylinders. If a working condition arises in which the capacity of the packaging machine exceeds that of the votator to a high degree, means are provided for automatically switching off the packaging machine in a certain extreme position, in order to avoid the production of packages that are not completely filled.

The resting apparatus described above is believed to be broadly novel and, although of special value in carrying out the process described above, it can also be used in other processes. Thus, for instance, in processes in which working after the completion of crystallisation is unnecessary, as when considerable working is effected in the votator, the outlet of the resting apparatus may be connected directly to the packaging machine instead of to the working apparatus, the connections to that machine being as described above for the connections to the working apparatus.

The cylindrical resting apparatus of FIGURES 2a, 2b and 2c, comprises a single crystallising chamber. It is very difficult to avoid channelling of the transported composition in a cylindrical space connected as a closed unit between the votator and the packaging machine. It has now been found, however, that a resting space in which channelling is avoided may advantageously be obtained by providing within the cylinder two parallel intermeshing helical conveying members arranged for slow rotation in opposite directions. If the composition should tend to stick to one of the helices, which would result in its rotating without being transported, the contact of the composition with the second helix will overcome this tendency. The pitch of the helices is preferably relatively great (for instance about equal to the diameter of the helices), so that the composition is not subjected to substantial working. In this way the composition is slowly transported through the resting space and is allowed to crystallise completely.

Apparatus for working margarines and plastic shortenings before packaging are well known. They commonly comprise means for exerting a beating or kneading effect. The working called for in the process of the present invention can be advantageously effected by the use of such conventional working apparatus, for instance that known as the Micro-Fix.

The invention will now be described in more detail with reference to the accompanying diagrammatic drawings in which:

FIGURE 2a is a part sectional plan view of a second form of resting apparatus and of a working apparatus coupled thereto;

FIGURE 2b is a part sectional side elevation taken along the line B—B of FIGURE 2a;

FIGURE 3 shows in side elevation the layout of an apparatus for carrying out the combined process of the invention.

Figures 1, 1A:
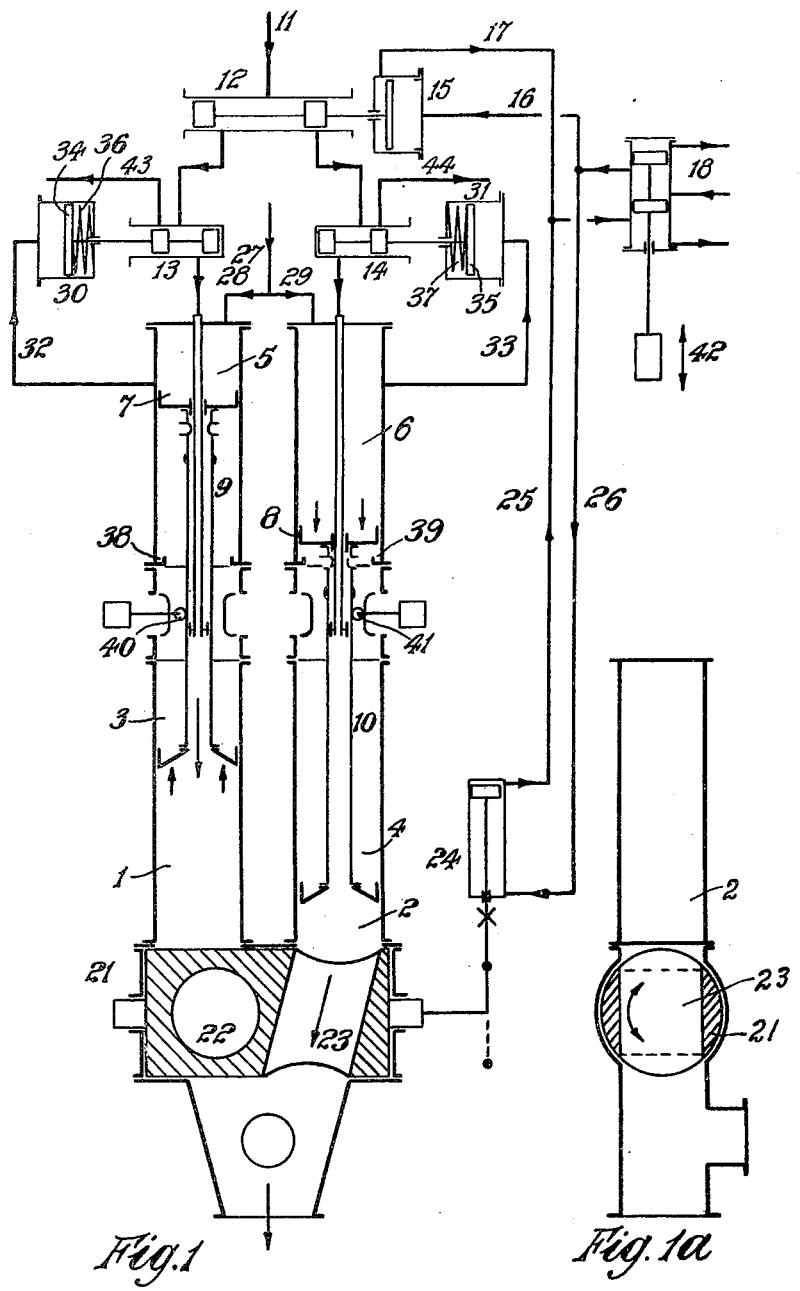
FIGURE 1 is a part sectional side elevation of one form of resting apparatus.
FIGURE 1a is a part sectional end elevation of part of the apparatus shown in FIGURE 1.

Referring to FIGURES 1 and 1a, the cylinders 1 and 2 through which the fatty composition passes are provided with pistons 3 and 4. These pistons preferably have a conically-concave operating surface. Coaxial with cylinders 1 and 2, are two air-cylinders 5 and 6, provided with pistons 7 and 8. Pistons 3 and 7 are connected by a hollow bar 9, and pistons 4 and 8 are connected by a hollow bar 10. 11 denotes the inlet conduit of the composition and 12 a distributing slide valve. Between this slide valve 12 and the cylinders, valves 13 and 14 are placed. Coaxial with slide valve 12 an air-cylinder 15 is provided. The inlet and outlet conduits for the compressed air are denoted by 16 and 17, these conduits being connected to the distributing slide valve 18 for the compressed air circuit. Between cylinders 1 and 2 and the working or packing apparatus (not shown) a rotary distributing valve 21 is arranged. This valve contains two passages 22 and 23, respectively, forming an angle with each other of preferably 90°. An air cylinder 24 is actuated by the distributing slide valve 18, 25 and 26 being the air connections between air cylinder 24 and the slide valve 18. Compressed air is introduced into the cylinder 5 and 6 by conduit 27, which branches into the two inlets 28 and 29. The valves 13 and 14 are coupled to air cylinders 30 and 31, respectively. These air cylinders possess inlets 32 and 33 for the compressed air, and pistons 34 and 35, on which springs 36 and 37 are acting. Further, in the cylinders 1 and 2, two abutments 38 and 39 are provided, as well as two electrical contacts 40 and 41. 42 denotes a time-relay. The working of the resting apparatus according to FIGURE 1 is as follows:

The fatty composition from the votator enters the system via inlet conduit 11 and is transported via distributing slide valve 12 to one of the cylinders (in the situation shown in the drawing, cylinder 1). Under normal conditions there is always a connection between cylinder 1 and valve 13, as well as between cylinder 2 and valve 14. Meanwhile, under the influence of the compressed air in space 6, the composition is being slowly moved by the piston 4, from the cylinder 2 via the connection 23 to the working or the packaging apparatus. The composition flowing into the cylinder 1 via pipe 9 presses the piston 3 upwards, against the pressure of the compressed air in space 5.

In normal operation the descending air piston (8 in the position shown in FIGURE 1) does not descend far enough to contact the abutments 39. Before this can happen the time relay 42 operates the air control valve 18 to shut off the air supply along air lines 16 and 26, and open them to the atmosphere while supplying air to the air lines 17 and 25. This operates the air cylinder 15 to move the slide valve 12 in a sense which cuts off the supply of the composition to the cylinder 1 and diverts it to cylinder 2, and at the same time operates the air cylinder 24 to turn the valve 21 through 90°, so closing the outlet from cylinder 2 to the working apparatus or packaging machine and opening the corresponding outlet from cylinder 1. Cylinder 2 thus begins to fill and pistons 4 and 8 to rise while cylinder 1 begins to empty owing to piston 3 being driven downwards by the air pressure on piston 7.

Suppose, however, that a condition arises in which the packaging machine works with a larger capacity than the votator. The result will be that pistons 3 and 4, respectively, will move downwards to an abnormal extent in the time that elapses before the relay 42 causes their movement to be reversed. This downward movement is limited by the abutments 38 and 39, which stop the downward movement of the pistons 7 and 8, respectively. When either of the pistons reaches the abnormally low position, an electrical contact 40 or 41, respectively, is broken, with the result that the packaging machine is stopped. In this way the continued operation of the plant under conditions which would produce incompletely filled packages is prevented.

Suppose, now, that the feed from the votator tends to exceed that with which the packaging machine can cope. The piston 3 or 4 respectively in the cylinder that is being filled, and in consequence the piston 7 or 8 coupled thereto, will rise to an abnormally high position. The piston 7 or 8 in so doing will shut off the air supply through the air line 32 or 33 respectively to the air cylinder 30 or 31 and this will result in the spring 36 or 37 urging the piston 34 or 35 outwards in consequence of which the slide valve 13 or 14 respectively will be operated to uncover the outlet 43 or 44 and so allow the excess composition to flow out of the system shown, the excess so removed, which has been referred to above as "re-work" margarine since it will normally be worked up again, providing part of the fat for further supplies of the fatty composition. In the position shown no re-work margarine is being produced.

Figures 2A, 2B:
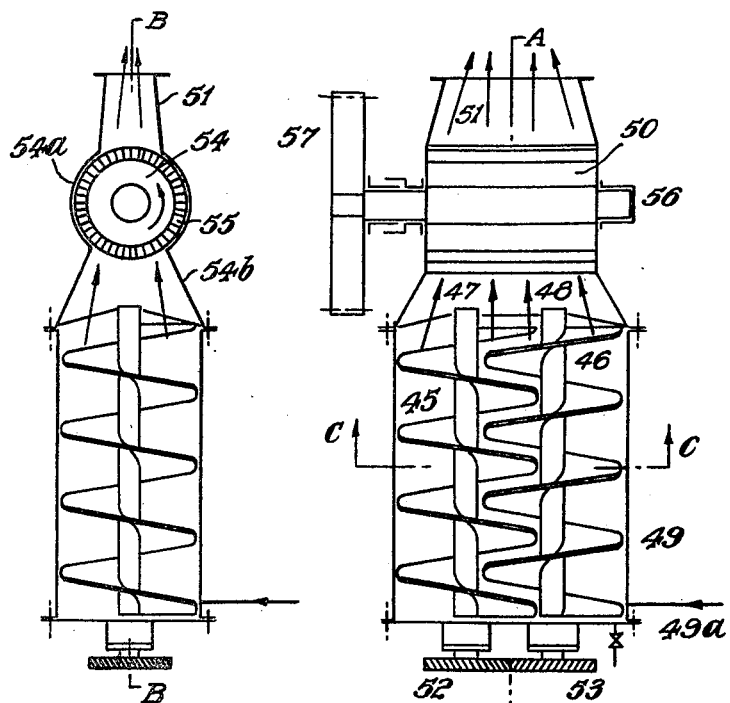
Figure 2C:
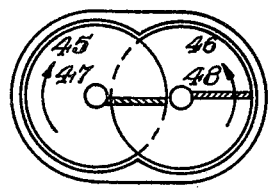
FIGURE 2c is a part sectional end elevation taken along the line C—C of FIGURE 2b.

In the apparatus shown in FIGURES 2a, 2b and 2c reference numerals 45 and 46 denote the intermeshing helices of two helical conveying members having shafts 47 and 48 respectively, mounted one above the other (as viewed in FIGURE 3; they could, of course, by mounted side by side), for rotation within a casing 49 having an inlet 49a at one end and communicating at the other end with a working apparatus 50. Means (the motor shown at 67a in FIGURE 3) are provided for driving the shafts 47 and 48 in opposite directions at the same speed through meshing gear wheels 52 and 53. The pitch of the helices, which are identical in construction, is approximately equal to their radius. The clearance between them is 50 mm. and the speed variable from ⅕ to 1 r.p.m.

The working apparatus 50 comprises a drum 54 which is fast on a shaft 56 mounted for rotation in a casing 54a communicating by means of a tapered inlet section 54b with the outlet end of the resting apparatus and having a tapered outlet 51 at the other end. The drum carries numerous radial vanes 55 mounted between two end flanges (not shown). Driving means indicated at 50a in FIGURE 3, are provided for driving the drum through the pulley 57, which is fast on the shaft 56.

In operation, the margarine or other fatty composition, fed from the resting apparatus through the inlet 54b onto the drum 54 is carried round by the vanes 55 which work it against the casting 54a, and issues from the outlet 51 whence it passes to a packaging machine.

Instead of the working apparatus described other forms of apparatus capable of exerting a beating or kneading effect on the material during its passage through the apparatus can be used.

Referring now to FIGURE 3, reference numeral 61 indicates a mixing vessel for forming the fatty composition (and, when margarine is being made, effecting emulsification with water). The composition from this vessel is fed by means of a pump 62 to the annular space of a votator 63 of the construction described above, where it is rapidly chilled, as described, and whence it passes in turn slowly through the resting apparatus 67, then through the working apparatus 50 from which it emerges as a product ready for packaging.

Figure 4:
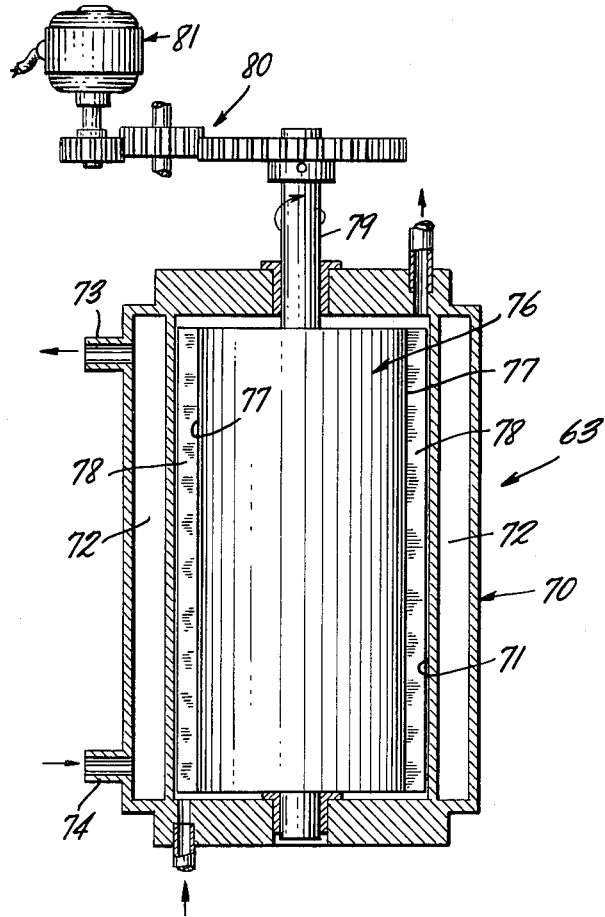
FIGURE 4 is a simplified enlarged part sectional side elevation of the votator shown in FIGURE 3.

Referring now to FIGURE 4, the votator 63 includes an outer cylindrical member 70 having an inner surface 71 and including a cooling jacket 72 which is connected with a suitable cooling unit (not shown) through a pair of conduits 73 and 74. Mounted for rotation concentrically within the outer cylindrical member 70 is an inner cylindrical member 76 which has an outer surface 77 and is provided with a plurality of scraper blades 78. The inner cylindrical member is mounted on a shaft 79 which is coupled through a conventional gear train 80 to an electric motor 81, for example. The preferred range of dimensions for the components of the votator 63 as well as the speed range at which the inner member 76 is rotated relative to the outer member 70 have been discussed above. For purposes of clarity, the spacing between the inner surface 71 and the outer surface 77 has been exaggerated in FIGURE 4.

The cooling circuit for the votator is of conventional kind, comprising an ammonia separator 65 from which liquid ammonia flows to the cooling jacket of the votator during passage through which vaporisation occurs, the gaseous ammonia returning via the separator to the compressor (not shown), the level of liquid ammonia in the separator being kept constant by means of controller 66.

The following examples, in which the apparatus used was as shown in FIGURE 3 of the drawings, illustrate the invention.

Example 1

A table margarine was made using the following composition:

- 15% liquid oil
- 30% nut oil
- 25% palm oil
- 30% hardened fat

In the mixing tank 61 the fatty and aqueous phases were mixed and emulsified, after which they were pumped by pump 62 to votator 63, which is of the construction described above. The cooling jacket of the votator is maintained by the ammonia circulation at a temperature of about −20° C. After rapid chilling during passage through the votator the composition passes to and slowly through the resting apparatus 67, and then through the working apparatus 50 to the packaging machine. The resting apparatus and working apparatus were as shown in FIGURES 2a, 2b and 2c of the drawings.

The conditions were as follows—

Cooling cylinder:
- Throughput _____ 150 kg./hr.
- Internal diameter, length, cooling surface, and clearance _____ As specified in Example 2.
- Rotor speed _____ 75–100 r.p.m.
- Temperature of ammonia _____ −22° C.
- Temperature of emulsion on entering the cooling cylinder ___ 36° C.
- Temperature of emulsion on leaving the cooling cylinder _____ 5–6° C.
- Pressure before cooling cylinder _ 27–30 kg./sq. cm.
- Pressure after cooling cylinder __ 2–3 kg./sq. cm.
- Power consumption of rotor ___ 2–3 kw.
- Average residence time in cooling cylinder _____ 3.5 sec.

Resting apparatus:
- Rest period _____ 7.4 min.
- Temperature after rest period __ 16–17° C.

Working apparatus:
- Temperature after working ____ 17–18° C.
- Power consumption in working apparatus _____ 0.7–1.5 kw.

Example 2

Using the same apparatus pastry margarines of the following compositions were made:

(a)
- 35% liquid oil
- 50% hardened fat
- 15% palm oil (b)
- 30% liquid oil
- 45% hardened fat
- 25% palm oil The conditions were as follows—

Cooling cylinder:
- Throughput _____ 65 kg./hr.
- Internal diameter _____ 150 mm.
- Length _____ 330 mm.
- Cooling surface _____ 0.155 sq. m.
- Clearance _____ 1 mm.
- Rotor speed _____ 75 r.p.m.
- Temperature of ammonia _____ −20° C.
- Temperature of emulsion on entering the cooling cylinder ___ 40° C.
- Temperature of emulsion on leaving the cooling cylinder _____ 0° C.
- Pressure before cooling cylinder _ 35 kg./sq. cm.
- Power consumption of rotor ___ 3 kw.
- Average residence time in cooling cylinder _____ 8 sec.

Resting apparatus:
- Rest period _____ 16.4 min.
- Temperature after rest period __ 14° C.

Working apparatus:
- Temperature after working ____ 20° C.
- Power consumption _____ 1.05 kw.

In the example the liquid oil may be ground nut oil, soyabean oil, cottonseed oil, sunflower oil, safflower oil or mixtures of these oils; the nut oil may be coconut oil, palm kernel oil or mixtures thereof, and the hardened oil may be a marine oil hardened to a slip-melting point of 30 to 50° C.

The invention includes the combination of: (a) means, comprising a scraped-surface heat exchanger having the characteristics specified above, for rapidly cooling the fatty composition from a temperature of 30 to 40° C. to a temperature at least as low as 5° C.; (b) a resting apparatus arranged to be fed from the said heat exchanger and comprising means for slowly and positively urging the composition through a closed space without substantial agitation while crystallisation is completed; and (c) means arranged to be fed from the resting apparatus for working the composition.

As indicated above, one suitable form of resting apparatus comprises a vessel providing a crystallising zone and within said zone a pair of intermeshing helical conveying members arranged to rotate very slowly in opposite directions so as to urge the composition through the crystallising zone without permitting channelling.

Another form of resting apparatus comprises a pair of cylinders, in each cylinder a liquid-tight piston arranged for backwards and forwards movement within predetermined limits therein, means for charging each cylinder in turn from the outlet side of the votator while allowing the piston in that cylinder to move backwards and means whereby when one cylinder is being so charged the other is being discharged to the inlet side of the working apparatus by a forward movement of the piston therein.

This second form of resting apparatus may comprise a pair of cylinders, in each cylinder a hollow liquid-tight piston arranged for backwards and forwards movement within predetermined limits therein, for each cylinder a valve-controlled outlet from the space in front of the piston for connection to the inlet side of the working apparatus, a valve-controlled inlet passing through the piston into said space for connection with the outlet side of the votator and valve-controlled means for admitting an operating fluid to the space behind the piston to drive it forwards in combination with means whereby each cylinder in turn is first charged by opening its inlet valve and closing its outlet valve and its operating fluid valve and then, when the piston has moved back to a predetermined extent, is discharged by reversing these valves and holding them in the reversed positions until the piston has moved forward to predetermined extent.

I claim:

1. A process for the production of a normally solid fat composition of the margarine and shortening type comprising providing a fat composition in molten form, rapidly cooling the molten fat composition to a temperature of −5° to +6° C. by passing it, in a time of 1 to 10 seconds, through a narrow annular space defined by two concentric cylindrical surfaces spaced 0.5 to 3 mm. apart, the ratio of the diameter to the axial length of the larger surface being from 1:1 to 1:4, refrigerating one of the surfaces, and scraping the refrigerated surface to an extent just adequate to keep the surface free from many crystal layer, scraping of the refrigerated surface being effected by the relative rotation of the two surfaces, the speeds of rotation of the two surface differing by 60 to 100 r.p.m., positively urging the cooled composition through a crystallisation zone without substantial working for at least five minutes until crystallisation is substantially completed, and thereafter working the crystallised composition to impart the desired plasticity.

2. A process according to claim 1, wherein the fat composition is selected from the group consisting of a table margarine composition and a shortening composition and the residence time within the annular space is 1 to 3 seconds.

3. A process according to claim 1, wherein the fat composition is a pastry margarine composition and the residence time within the annular space is 2 to 8 seconds.

4. A process according to claim 1, wherein the curved surfaces defining the annular space are concentric cylindrical surfaces, the diameter of the larger one being 15 to 50 cm. and its axial length being 30 to 50 cm.

5. A process according to claim 1, wherein the cooled fat composition is slowly urged through the crystallising zone by a pair of intermeshing helical surfaces rotating in opposite directions at a rate which prevents substantial working.

6. A process according to claim 1, wherein the cooled fat composition is slowly urged through the crystallising zone by a piston moving axially through said zone at a rate which prevents substantial working.

References Cited by the Examiner

UNITED STATES PATENTS

| | | | |
|---|---|---|---|
| 2,013,025 | 9/1935 | Bottoms et al. | 99—118 X |
| 2,022,924 | 12/1935 | Reynolds | 99—122 |
| 2,098,010 | 11/1937 | Newton et al. | 99—122 |
| 2,197,457 | 4/1940 | Werk et al. | 99—122 |
| 2,330,986 | 10/1943 | Miller et al. | 99—122 |
| 2,395,051 | 2/1946 | Horneman et al. | 99—244 |
| 2,693,873 | 11/1954 | Martin | 198—213 |
| 2,778,482 | 1/1957 | Losch et al. | 198—213 |
| 2,987,986 | 6/1961 | Euwe | 99—244 |
| 3,069,996 | 12/1962 | Robichaux | 99—244 |

OTHER REFERENCES

Schwitzer: "Margarine and Other Food Fats," Interscience Publ., Inc., New York, 1956, p. 248.

A. LOUIS MONACELL, *Primary Examiner.*

M. W. GREENSTEIN, *Assistant Examiner.*